United States Patent
Bönning et al.

(10) Patent No.: US 6,474,385 B1
(45) Date of Patent: Nov. 5, 2002

(54) WELDED VEHICLE WHEEL

(75) Inventors: Meinhard Bönning; Ralf Duning; Jorn Hansen, all of Solingen; Dieter Schichall, Hilden, all of (DE)

(73) Assignee: Michelin Kronprinz Werke GmbH, Solingen (DE)

( * ) Notice: Subject to any disclaimer, the term of this patent is extended or adjusted under 35 U.S.C. 154(b) by 0 days.

(21) Appl. No.: 09/530,377

(22) PCT Filed: Oct. 27, 1997

(86) PCT No.: PCT/DE97/02558

§ 371 (c)(1),
(2), (4) Date: Apr. 27, 2000

(87) PCT Pub. No.: WO99/21727

PCT Pub. Date: May 6, 1999

(51) Int. Cl.$^7$ ................................................. B60B 21/10
(52) U.S. Cl. ........................... 153/381.4; 152/381.3; 152/379.3; 301/95.107; 301/63.101
(58) Field of Search ............................ 152/379.3, 379.4, 152/379.5, 381.3, 381.4, 381.6, 384; 301/95, 97, 98, 96, 95.101, 95.107, 95.108, 63.101

(56) References Cited

U.S. PATENT DOCUMENTS

| | | | | |
|---|---|---|---|---|
| 1,551,445 A | * | 8/1925 | Wagnehorst | 152/381.6 |
| 4,502,521 A | * | 3/1985 | Tavazza et al. | 152/381.4 |
| 4,878,527 A | * | 11/1989 | Noma | 152/379.3 |
| 4,940,069 A | * | 7/1990 | Nakaski et al. | 152/379.3 X |
| 5,070,921 A | * | 12/1991 | Wada et al. | 152/379.5 X |
| 6,074,015 A | * | 6/2000 | Renard et al. | 301/95 X |
| 6,183,047 B1 | * | 2/2001 | Kuhl | 301/97 |

FOREIGN PATENT DOCUMENTS

| | | | | |
|---|---|---|---|---|
| DE | 34 42 443 | | 5/1986 | |
| DE | 37 04 384 | | 8/1988 | |
| FR | 49486 | * | 5/1939 | 301/97 |
| FR | 1131508 | * | 2/1957 | 301/97 |
| GB | 1 563 095 | | 3/1980 | |
| GB | 1 587 902 | | 4/1981 | |
| GB | 2117332 A | * | 10/1983 | 301/97 |
| JP | 63-28701 A | * | 2/1988 | 152/379.3 |
| JP | 7 223 402 | | 8/1995 | |
| SU | 1530-491 A | * | 12/1989 | 301/95 |
| SU | 1555-145 A | * | 4/1990 | 301/97 |

* cited by examiner

Primary Examiner—D. Glenn Dayoan
Assistant Examiner—Patricia L. Engle
(74) Attorney, Agent, or Firm—Cohen, Pontani, Lieberman & Pavane

(57) ABSTRACT

A welded vehicle wheel having a sectional rim which is connected to a nave or wheel disk in the area of the drop center by means of a weld seam, and which has standardized sections, in particular rim flange and bead seat area in terms of their axial and/or radial extent, transition radii and angles, and nonstandardized sections, in particular drop center area. Here, a nonstandardized section has at least one cambered part which reinforces the rim and extends radially and over the entire circumference, the center axis of the cambered part being coaxial with the axis of the rim and being located outside the usual rim section

4 Claims, 2 Drawing Sheets

WELDED VEHICLE WHEEL

PRIORITY CLAIM

This is a U.S. national stage of application No. PCT/DE97/02558, filed on Oct. 27, 1997. Priority is claimed on that application.

BACKGROUND OF THE INVENTION

1. Field of the Invention

The invention relates to a welded vehicle wheel having a sectional rim which is connected to a nave or wheel disk in the area of the drop center by means of a weld seam,

2. Discussion of the Prior Art

In the course of the standardization of goods and products in the European market, certain sections have also been uniformly defined for the rims of vehicle wheels. This applies in particular to the rim flanges and the bead seat area in terms of their axial and/or radial extent, transition radii and angles. However, there are also sections, in particular in the drop center area, whose design can to a certain extent be freely determined by the manufacturer of the rim.

If, in the first instance, the wheel is considered under load, it is similar, viewed in elastic terms, to a flattened egg because the wheel is deformed by the weight of the vehicle and is pressed flat with the underlying surface in the vicinity of the contact area. The rotation of the wheel causes the egg shape to migrate around the wheel with the result that respective alternating stresses occur. A critical area in this respect is the weld point of the nave and/or of the wheel disk in the drop center area. Here, when the wheel is subject to severe loading, fractures may, under certain circumstances, occur. The weld point is also problematic in that the application of the welding heat causes the cold-hardened structure of the rim to become recrystallized and coarse-grained.

PA J (Patent Abstracts of Japan) 07223402 A discloses a vehicle wheel which has a sectional rim which is connected to a wheel disk in the area of the drop center by means of a weld seam. In contrast to usual conventional sectional rims, the rim has a section of the drop center which has a pronounced radially thickened portion on the outside of the wheel. This thickened section is provided on the inside at the outer end with a right-angled shoulder against which a projection, arranged on the outermost circumference, on the wheel disk comes to bear when pressing-in occurs. Such a thickening of a rim section increases the rigidity of the vehicle wheel but is unfavorable in terms of the weight and the formation of faults in the area where material accumulates. The faults in turn cause an unbalance of the vehicle wheel.

A different type of structure is disclosed in German reference DE 33 11 697 A1. The sectional rim which is provided with a drop center has a double or even triple hump on the outside of the wheel, the hump which lies axially further toward the inside being smaller in diameter than the hump which lies further toward the outside. The respective hump extends continuously over the circumference and is located in a plane at right angles to the axis of the rim. The center point of the respective hump is eccentric to the axis of the rim. The eccentric position of the humps in different axial positions leads to a dynamic unbalance and causes the vehicle wheel to undergo oscillations which cannot be overcome at all or can be overcome only partially by applying compensation weights.

A passenger car wheel of a particular design is presented in German reference DE 37 04 384 A1. The sectional rim which is manufactured from sheet metal has a drop center which is provided with a cambered part which extends radially outward. A nave which is produced from sheet metal and which is provided in the annular circumferential part with a bead which fits the cambered part in a complementary fashion can be clipped into this cambered part. This cambered part in the drop center of the rim does not provide reinforcing but rather serves only to hold the nave which can be clipped in.

SUMMARY OF THE INVENTION

The object of the invention is to modify a welded vehicle wheel of the generic type in such a way that, without increasing the weight, the risk of fracturing in the area of the weld point is minimized, even when the wheel is subjected to severe loading. which reinforces the rim and extends radially and over the entire circumference. The center axis of the cambered part is coaxial with the axis of the rim and is located outside the usual rim section. Preferably, the cambered part is located in the area of the drop center and/or ledge. This selective reinforcement can be used to reduce the previously necessary minimum thickness for the rim. However, at the same time, it is necessary to bear in mind that a portion of the resulting reduction in weight is used up again by the greater length of the rim when stretched out, which results from the cambering, and in the worst case is cancelled out by it. However, because the reduction in weight is not the main object of the invention, but rather a welcome secondary effect, the vehicle wheel according to the invention fulfills the more important requirement relating to the loading of the critical area of the weld point, even when the weight is unchanged.

BRIEF DESCRIPTION OF THE DRAWING

The welded vehicle wheel according to the invention is explained in more detail with reference to a number of exemplary embodiments in the drawing, in which.

DETAILED DESCRIPTION OF THE PREFERRED EMBODIMENTS

Figure 1:
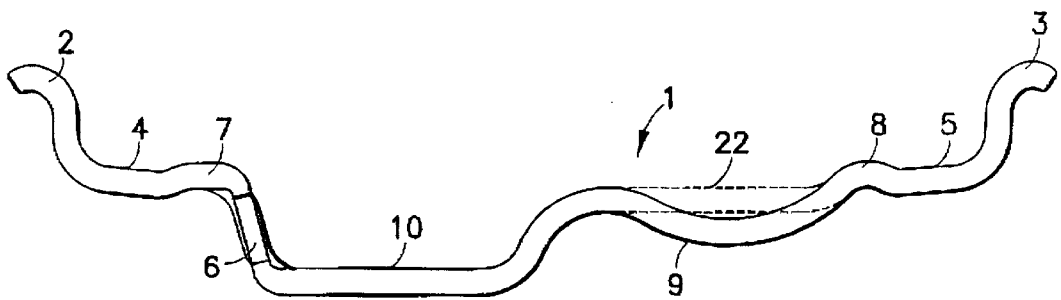
FIG. 1 shows a longitudinal section of a first embodiment of the rim according to the invention.

FIG. 1 represents a longitudinal section of a first embodiment of the rim 1 according to the invention. The rim 1 has standardized sections such as the two rim flanges 2, 3, the bead seat areas 4, 5 and the valve hole 6. In this exemplary embodiment, the rim 1 is provided in each case with a hump 7, 8. According to the invention, in a nonstandardized section of the rim 1, a cambered part 9 which reinforces the rim 1, extends radially inward and then merges with the drop center 10 is provided. The contour 22 (illustrated by dashed lines) is intended to indicate the configuration of the rim which is otherwise conventional usual, in order to clarify the difference with respect to the design according to the invention.

Figure 2:
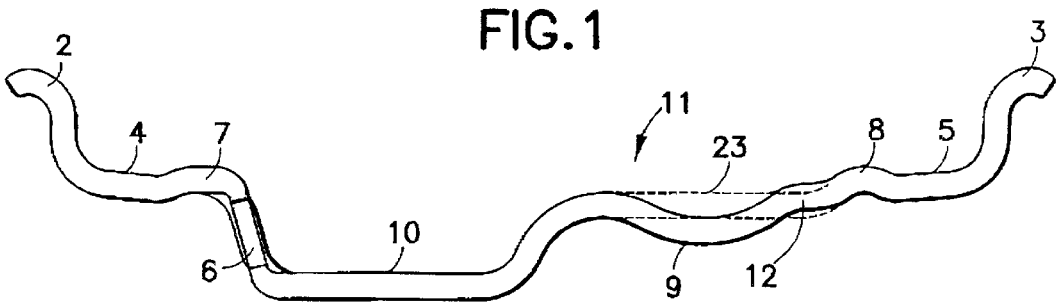
FIG. 2 shows a second embodiment.
Figure 3:
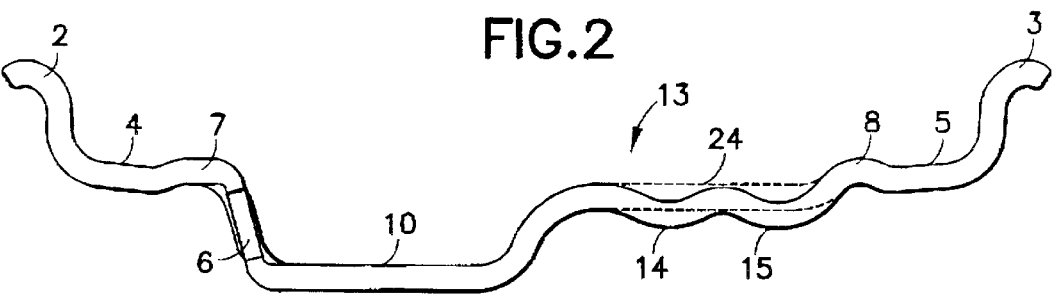
FIG. 3 shows a third embodiment.
Figure 4:
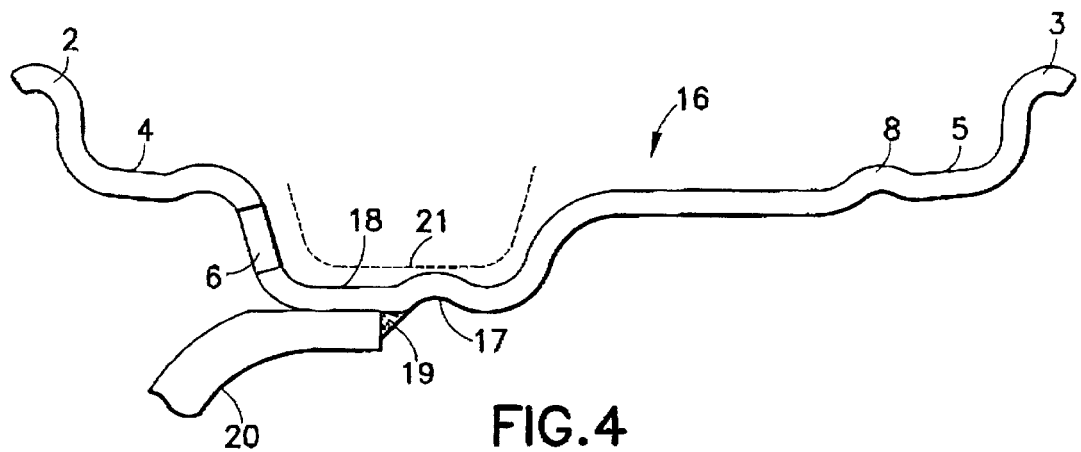
FIG. 4 shows a fourth embodiment with part of the nave.

The following FIGS. 2 to 4 show further embodiments, identical reference symbols having been used for identical areas. In contrast to FIG. 1, the rim 11 has, in addition to the cambered part 9 which is provided, another area 12 for precentering the tire (not illustrated here) when pulling it on. Here too, the contour 23 of the rim which is otherwise conventional is illustrated with dashed lines.

In FIG. 3, in contrast to FIG. 1, two radially inwardly extending cambered parts 14, 15 are provided for the rim 13. The sectional shape which lies outside the original contour 22, 23, 24 (dashed lines) is a distinguishing feature of the cambered parts 9, 14, 15 illustrated in FIGS. 1 to 3.

In the embodiment illustrated in FIG. 4, the reinforcing cambered part 17 is provided directly in the drop center 18, the cambered part 17 being directed radially outward in contrast to the preceding FIGS. 1 to 3. In the drop center area 18, the nave 20, which is illustrated here only partially, is connected to the rim 16 by means of a weld seam 19. The direct proximity of the cambered part 17 to the weld point relieves the weld seam 19 and the area surrounding it of alternating stress. The reference symbol 21 refers to the minimum contour prescribed by the standard so that the cambered part 17 lies, according to the invention, outside this contour 21.

Figure 5:
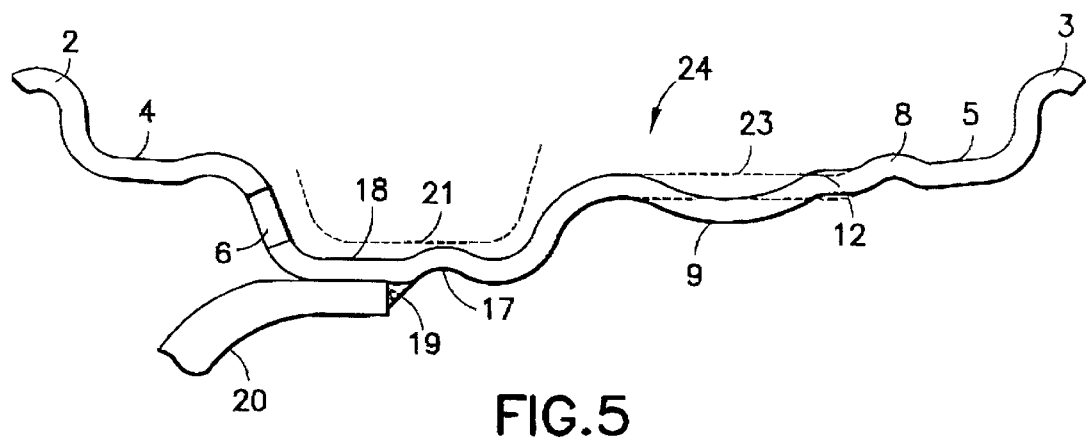
FIG. 5 shows an embodiment that combines the ledge part of FIG. 2 and the drop center of FIG. 4.

FIG 5 illustrates an embodiment in which the reinforcing cambered part 9 is arranged at the ledge portion of the rim 24, and a reinforcing cambered part 17 is arranged in the drop center 18. The cambered part 9 is directed radially inward and the cambered part 17 is directed radially outward.

What is claimed is:

1. A welded vehicle wheel, comprising: a disk; and a rim having two rim flanges, bead seat areas, a drop center area and a ledge area, the rim being connected to the disk in the drop center area by a weld seam, the drop center area and the ledge area each having a substantially constant thickness and each further having a cambered part which reinforces the rim and extends radially and over an entire circumference of the rim, the weld seam being adjacent the cambered part of the drop center area on an axially outward side.

2. A welded vehicle wheel as defined in claim 1, wherein the ledge area has two adjacent cambered parts.

3. A welded vehicle wheel as defined in claim 1, wherein the cambered part in the ledge area is directed radially inward.

4. A welded vehicle wheel as defined in claim 1, wherein the cambered part in the drop center area is directed radially outward.

* * * * *